United States Patent [19]

Mittnacht et al.

[11] 4,144,204

[45] Mar. 13, 1979

[54] IMPACT-RESISTANT THERMOPLASTIC MOLDING COMPOSITIONS WITH INCREASED STRESS CRACK RESISTANCE

[75] Inventors: Hans Mittnacht, Weinheim; Adolf Echte, Ludwigshafen; Helmut Jenne, Schriesheim; Manfred Lieb, Ludwigshafen; Klaus Bronstert, Carlsberg; Hansjoerg Adler, Bonndorf, all of Fed. Rep. of Germany

[73] Assignee: BASF Aktiengesellschaft, Ludwigshafen, Fed. Rep. of Germany

[21] Appl. No.: 686,367

[22] Filed: May 14, 1976

[30] Foreign Application Priority Data

Jun. 5, 1975 [DE] Fed. Rep. of Germany ... 2525019

[51] Int. Cl.$^2$ .......................... C08L 7/00; C08L 25/04; C08L 9/00
[52] U.S. Cl. ............................... 260/4 AR; 260/880 R
[58] Field of Search ......................... 260/4 AR, 880 R

[56]           References Cited
           U.S. PATENT DOCUMENTS

| 2,694,692 | 11/1954 | Amos et al. | 260/880 R |
| 2,862,906 | 12/1958 | Stein et al. | 260/880 R |
| 3,243,481 | 3/1966 | Rulling et al. | 260/880 R |
| 3,644,587 | 2/1972 | Finberg | 260/4 AR |

OTHER PUBLICATIONS

Stein et al., "Crosslinking Reactions in High Impact Polystyrene Rubber Particles", Advances in Chem. Series 142, (1975), p. 148ff. ACS.

*Primary Examiner*—Harold D. Anderson
*Attorney, Agent, or Firm*—Keil & Witherspoon

[57]           ABSTRACT

Thermoplastic molding compositions, based on polymers of a monovinyl-aromatic compound which have been modified with rubber to increase their impact strength, which also exhibit increased stress crack resistance.

The increased stress crack resistance is achieved if the proportion of the soft component in the polymer which has been modified to increase its impact strength, and the particle size and swelling index of the soft component phase, conform to particular values, and the tensile strength and yield stress of the thermoplastic molding compositions bear a particular ratio to one another.

The molding compositions may in particular be used for the manufacture of internal liners of refrigerators and foodstuff packaging containers.

10 Claims, No Drawings

IMPACT-RESISTANT THERMOPLASTIC MOLDING COMPOSITIONS WITH INCREASED STRESS CRACK RESISTANCE

The present invention relates to thermoplastic molding compositions based on polymers of monovinyl-aromatic compounds, which polymers have been modified with rubber to increase their impact strength, and which can be used for the manufacture of moldings having increased stress crack resistance.

It is known that articles made from styrene polymers which have been modified to increase their impact strength are prone to stress cracking as soon as they come into contact with agents which normally cause such cracking. These include numerous organic media; those which are particularly known to cause stress cracking include, on the one hand, fats and oils, and, on the other, organic blowing agents, e.g. halohydrocarbons containing fluorine and chlorine. The former have an adverse effect on polystyrene packaging of foodstuffs and the latter have an adverse effect, e.g., on refrigerators made from impact-resistant polystyrene. Thus, packaging cups of impact-resistant polystyrene, which contain margarine, easily split radially at the bottom when stacked on top of one another, whilst internal liners of refrigerators may crack when the cavity behind them is being filled with polyurethane foam, as a result of the halohydrocarbon blowing agent used. This adverse property restricts the possible uses of impact-resistant polystyrene in the above fields. To avoid stress cracking, it is necessary either to protect the material against attack by the aggressive medium by resorting to expensive technical procedures, e.g. by inserting intermediate protective layers when filling the cavity behind refrigerator liners with foam, or to resort to the use of more expensive materials, e.g. styrene-acrylonitrile copolymers which have been rendered impact-resistant by modifying them with polydienes (i.e. ABS polymers).

An attempt has also already been made to improve the stress crack resistance of styrene polymers which have been modified to increase their impact strength, by subsequent admixture of more rubber. However, even at high rubber contents the effect observable is only slight.

It is an object of the present invention to provide styrene polymers modified with rubber to increase their impact strength which also exhibit increased stress crack resistance.

We have found that this object is achieved and that the stress crack resistance of polymers of monovinyl-aromatic compounds which polymers have been modified with rubber to increase their impact strength, is very greatly improved if they conform to particular combinations of properties stipulated according to the invention.

Accordingly, the present invention relates to thermoplastic molding compositions containing a polymer of a monovinyl-aromatic compound which polymer has been modified with a rubber to increase its impact strength and has been obtained by polymerizing the monovinyl-aromatic compound in the presence of the rubber. In these molding compositions (1) the proportion of soft component in the polymer which has been modified to increase its impact strength is at least 28% by weight, based on the said polymer, the soft component being defined as the toluene-insoluble constituent of the polymer which has been modified to increase its impact strength, minus any pigment which may be present, (2) the particles of the disperse soft component phase in the polymer which has been modified to increase its impact strength have a mean (weight average) diameter of at least $4\mu$, (3) the swelling index of the soft component in toluene is greater than 9.5 and (4) the tensile strength of the thermoplastic molding compositions, measured on a compression-molded dumbbell-shaped bar by the DIN 53,455 tensile test, is at least 5% above the corresponding yield strength. The abbreviation DIN refers to Deutsche Industrie Norm, which constitutes a German standard specification for testing procedures.

Polyvinyl-aromatics, which have been modified to increase their impact strength, and which conform to one, two or three of the above characteristics have already been disclosed. However, all these products are still very prone to stress cracking.

It was therefore totally surprising that molding compositions based on polymers of monovinyl-aromatic compounds which polymers have been modified with rubber to increase their impact strength (hereinafter usually referred to as "impact-resistant polymers" for the sake of convenience) and which exhibit the combination of all the above characteristics, in accordance with the invention, give, after processing, products which are particularly resistant to stress cracking and which can be employed, without special protective measures, in, e.g., refrigerator construction or foodstuff packaging.

The impact-resistant polymers can be manufactured in accordance with any conventional process, provided the above pattern of properties is obtained. The usually used processes are mass polymerization or solution polymerization based on U.S. Pat. No. 2,694,692 and similar processes, or mass suspension polymerization, as disclosed, e.g., in U.S. Pat. No. 2,862,906; however, other processes of manufacture may also be used, provided they are able to give products having the above characteristics.

Suitable monovinyl-aromatic compounds are in particular styrene, as well as styrenes alkylated in the nucleus or sidechain, e.g. α-methylstyrene and vinyltoluene. The monovinyl-aromatic compounds may be employed singly or as mixtures. The use of styrene by itself is preferred.

The rubbers employed are the natural or synthetic rubbers conventionally used for modifying styrene polymers to increase their impact strength. Suitable rubbers, for the purposes of the invention, are natural rubber and also, e.g., polybutadiene, polyisoprene and copolymers of butadiene and/or isoprene with styrene and other comonomers having a glass transition temperature below $-20°$. These rubbery copolymers of butadiene and/or isoprene may contain the copolymerized monomer units either statistically distributed or in blocks. Further suitable rubber components for the impact-resistant polymers according to the invention are elastomeric ethylene-propylene copolymers and ethylene-propylene-diene terpolymers, silicone rubbers containing unsaturated groups, and others.

The impact-resistant polymers which have the pattern of properties according to the invention are manufactured by polymerizing the monovinyl-aromatic compounds in the presence of the rubber. As stated above, the polymerization is as a rule carried out in the conventional manner by mass polymerization, solution polymerization or polymerization in aqueous dispersion, the rubber first being dissolved in the polymerizable monomer and this solution then being subjected to polymerization.

In the case of solution polymerization, this starting solution may in addition be mixed with up to 50% by weight, based on the monovinyl-aromatic compounds employed, of an inert diluent. Examples of suitable inert diluents are aromatic hydrocarbons or mixtures of aromatic hydrocarbons. Toluene, ethylbenzene, the xylenes or mixtures of these compounds are preferred.

In the case of polymerization in aqueous dispersion, the addition of solvents is as a rule dispensed with; in a particularly advantageous embodiment, the solution of the rubber in the monomer is prepolymerized by mass polymerization up to a conversion of about 30% whilst subjecting the mixture to shearing forces, and then the mixture is suspended in water and the polymerization is taken to completion. In general, this process is initiated by adding oil-soluble initiators which decompose to give free radicals, such as benzoyl peroxide, dicumyl peroxide, di-tert.-butyl peroxide, azo-diisobutyronitrile and the like, or combinations of these, but the prepolymerization can also be initiated thermally. The suspending agents used are the conventional water-soluble suspending agents, e.g. methylcellulose, hydroxypropylcellulose, polyvinyl alcohol, partially saponified polyvinyl acetates and the like, or inorganic dispersions, e.g. of barium sulfate. In general, the amounts of suspending agent employed are from 0.1 to 5% by weight, based on the organic phase.

In the case of mass polymerization or solution polymerization, the temperature range used is as a rule from 50° to 250° C. and preferably from 100° to 200° C. The polymerization batch must be stirred thoroughly, at least during the first stage of the polymerization, i.e. up to conversions, of the monovinyl-aromatic compounds, of 35% by weight or less. All these polymerization processes are adequately known and details are described in the literature. A summary is to be found in Amos, Polym. Engng. Sci. 14 (1974) 1, pages 1–11, and in U.S. Pat. Nos. 2,694,692 and 2,862,906, to which reference may be made for further details.

For the purposes of the invention, soft component means the constituent of the polymer which has been modified to increase its impact strength, which is insoluble in toluene at room temperature (25° C.), minus any pigment which may be present. Accordingly, the soft component corresponds to the gel constituent of the product.

In general, the soft component has a heterogeneous structure; it forms, as a rule, during the process of manufacture and its amount and degree of dispersion is affected by the process conditions. As is known, the solution, which is to undergo polymerization, of the rubber in the monovinyl-aromatic monomer separates, immediately after the start of the reaction, into two phases, one of which, namely a solution of the rubber in the vinyl-aromatic monomer, initially forms the continuous phase, whilst the second phase, namely a solution of the poly(vinyl-aromatic) in its own monomer, remains suspended as droplets in the first phase. As the conversion increases, the amount of the second phase increases at the expense of the first phase, and with consumption of monomer; hereupon, an inversion in phase continuity takes place, in which droplets of the rubber solution in the solution of the poly(vinyl-aromatic) are formed; however, these droplets, in turn, retain firmly occluded smaller droplets of what is now the continuous phase.

In addition to this process, a grafting reaction takes place, during which chemical bonds are formed between the rubber molecules and the poly(vinyl-aromatics), i.e. graft copolymers are formed from the two constituents. This process is known and is described in detail in, e.g., Fischer, Angew. Makrom. Chem. 33 (1973), 35–74. Both that part of the poly(vinyl-aromatic) which has been grafted to the rubber, and that part which has been mechanically occluded in the rubber particles, are to be considered as part of the soft component.

When the mass has polymerized completely, a heterogeneous soft component has been formed, which is embedded in a hard matrix of the poly(vinyl-aromatic) and which consists of grafted rubber particles, with some occluded matrix material, namely poly(vinyl-aromatic). The larger the amount of occluded matrix material, the larger the amount of soft component, for a constant rubber content. Accordingly, this depends not only on the amount of rubber employed but also on how the process is conducted, in particular before and during phase inversion. The individual measures are specific to the process and are known in the art (see, e.g., Freeguard, Brit. Polym. J. 6 (1974), 205–228, and Wagner and Robeson, Rubber Chem. Techn. 43 (1970), 1129 et seq.).

In order to obtain impact-resistant thermoplastic molding compositions having the characteristics according to the invention, the amount of rubber which is dissolved in the monomer, prior to the polymerization, so as to prepare the starting solution, is chosen, in accordance with the final conversion of the polymerization reaction, so that the content of soft component in the resulting impact-resistant polymer of the monovinyl-aromatic compounds is at least 28% by weight, and preferably 30% by weight or more, based on the impact-resistant polymer. The upper limit of the content of soft component is imposed by the requirement that the poly(vinyl-aromatic) shall form the continuous phase and is about 50–60% by weight. In the case of the thermoplastic molding compositions of the invention, a content of soft component of from 30 to 40% by weight, based on the impact-resistant polymer, has proved particularly advantageous. This means that the rubber content of the said polymer is in general from 2 to 15% by weight and preferably from 5 to 12% by weight.

As has been explained above, and is well known, the impact-resistant polymers of the monovinyl-aromatic compounds consist of a polymer of the said compound, in which are embedded, as the disperse phase, the rubber particles of the soft component, these particles having undergone partial crosslinking and having had a greater or lesser amount of monovinyl-aromatic compounds grafted onto them during the polymerization.

To achieve good stress crack resistance, the particle size of these rubber particles in the disperse soft component in the impact-resistant polymers must, according to the invention, be above the optimum for products of high impact strength. According to Applied Polymer Symposia 15 (1970), page 74 (d), the particle size distribution of the disperse rubber phase, expressed in terms of the diameter, is from 1 to 5$\mu$ for impact-resistant styrene polymers intended to represent an optimum in respect of the usual mechanical properties, and the mean value, that is to say the optimum diameter, is thus 3$\mu$.

In contrast, in the impact-resistant products with good stress crack resistance according to the present invention, the mean (weight average) particle diameter of the disperse rubber phase must be at least 4μ and preferably at least 5μ. The best results are obtained when the mean particle diameter of the disperse rubber particles, which constitute the soft component, in the impact-resistant polymers is from 5 to 10μ. The mean particle size of the rubber particles in the disperse soft component may be determined, e.g., by counting and evaluating electron microphotographs of thin layers of the impact-resistant polymers (compare F. Lenz, Zeitschrift f. Wiss. Mikroskopie 63 (1956), 50–56).

The particle size of the disperse soft component phase is regulated in the conventional manner, during the polymerization of the monovinyl-aromatic compounds, by varying the speed of stirring during the first stage of the polymerization, i.e. up to a monomer conversion of 35% or less. The lower the stirrer speed and hence the lower the shear stress, the greater the particle size of the disperse soft component phase. The relationship between speed of stirring and size and distribution of the rubber particles in the resulting impact-resistant polymer is described, e.g., in the publication by Freeguard, cited above, to which reference may be made for further details. The speed of stirring required to achieve the desired particle size of the disperse soft component phase depends, inter alia, on the particular details of the apparatus and is known in the art or can be determined by a few simple experiments.

A further essential characteristic of the present invention is that the swelling index of the soft component in toluene after polymerization of the monovinyl-aromatic compounds is greater than 9.5. The swelling index is determined at the same time as the proportion of soft component. For this purpose, the polymer is dissolved in toluene at room temperature (25° C.) and the insoluble gel constituent is centrifuged at 30,000 g, and is isolated after decanting the solution, weighed moist, dried and weighed again.

The swelling index is defined as the following ratio $$Q = \frac{\text{Wet weight of the gel}}{\text{Dry weight of the gel}}$$

It indicates the ability of the gel to bind varying quantities of solvent. It is therefore a measure of the degree of crosslinking of the rubber constituent in the soft component. The higher the swelling index, the lower the density of crosslinks in the rubber phase. The numerical value of the swelling index depends on the solvent; the numerical values referred to in the context of the present invention relate to toluene.

The proportion of soft component is also measured in toluene; it is given by the equation $$G = \frac{\text{Dry weight of the gel}}{\text{Weight of polymer sample}} \cdot 100 \text{ [\% by weight]}$$

This content of soft component (also referred to as the gel content) must, according to the invention, be at least 28%. The optimum swelling index can be achieved in the conventional manner by varying the operating conditions, the details depending on the particular process of manufacture. Usually, the appropriate swelling index is obtained by suitable choice of the temperature at which the polymers are worked up and/or by adding crosslinking assistants such as peroxides and the like. Preferably, the swelling index should be from 11 to 13.

Finally, it is necessary according to the invention that the tensile strength of the finished products should be at least 5%, preferably from 10 to 50%, and especially from 10 to 40%, above the corresponding yield strength. To examine this, the tensile strength and yield strength of the thermoplastic molding compositions are measured on a compression-molded dumbbell-shaped bar according to DIN 53,455 and the difference Δ6 of the two measured values is calculated and related to the measured value of the yield strength:

$$S = \frac{\Delta \sigma}{\sigma} = \frac{\text{Tensile strength} - \text{yield strength}}{\text{yield strength}} \cdot 100 \text{ [\%]}$$

This requirement of the invention is usually fulfilled if the impact-resistant polymers of the monovinyl-aromatic compounds contain — as is required by the invention — at least 28% by weight of the soft component, and if the swelling index of the soft component is greater than 9.5.

However, the ratio of the tensile strength to the yield strength can be influenced by conventional additives, especially lubricants and dyes. Thus, it is possible to modify the ratio of tensile strength to yield strength, merely by adding large amounts of lubricant, so that the tensile strength becomes lower than the corresponding yield strength. The nature of the lubricant used is also of decisive importance. In the case just referred to, the finished products no longer have the desired stress crack resistance. Hence, it is necessary to ensure, when manufacturing the thermoplastic molding compositions of the invention, that the nature and amount of the conventional additives, especially lubricants and dyes, is suitably selected so that the tensile strength of the end product is higher than the corresponding yield strength. From this point of view, conventional non-polar lubricants, e.g. mineral oil, are more suitable than conventional polar lubricants, e.g. butyl stearate.

In addition to the other good mechanical and service properties of impact-resistant styrene polymers, the thermoplastic molding compositions of the present invention exhibit substantially improved stress crack resistance. They are therefore exceptionally suitable especially for the manufacture of refrigerator components and foodstuff packaging containers.

The Examples which follow illustrate the invention. Parts and percentages are by weight, unless stated otherwise. The products are tested by the following methods:

1. The tensile strength (N/mm$^2$) and yield strength (N/mm$^2$) were determined on a compression-molded dumbbell-shaped bar according to DIN 53,455.

2. The content of soft component (i.e. the gel content) was determined by preparing a 5.7% strength solution of the polymer in toluene, centrifuging the insoluble gel at 30,000 g, decanting the supernatant solution and drying the residue (i.e. the gel). The gel content is calculated from the equation given above.

3. The swelling index is calculated from the wet weight and dry weight, obtained during determination of the gel content, in accordance with the equation given above.

4. The mean (weight average) particle size of the disperse soft component phase was determined by counting and averaging the particles, belonging to the same size category (constant unit intervals) using electron microphotographs of thin layers. The cumulative distribution curve is determined from the volume of the particles (3rd power of the apparent diameter) within the intervals. The equivalent diameter can then be read off the abscissa corresponding to the 50% ordinate value. The mean diameters quoted represent the mean value of at least 5,000 particles.

5. The stress crack resistance was measured as follows:

(a) Resistance to fat: This was tested according to DIN 53,444 by determining the breaking stress (kg/cm$^2$) in a medium consisting of a 1:1 mixture of olive oil and oleic acid at 23° C. To conform to practical requirements, the breaking stress for 100 hours exposure should not be less than 38–40 kg/cm$^2$.

(b) Resistance to low-boiling halohydrocarbons: This was determined by testing the elongation according to DIN 53,455 on a compression-molded dumbbell-shaped bar after 50 minutes' storage, in a defined prestressed form, in an atmosphere of the low-boiling halohydrocarbons, the determination being carried out in comparison to the untreated sample. The elongation must not fall to below 75% of the initial value.

In the Examples which follow, products which exhibit only some of the characteristics required according to the invention (Comparative Experiments A–E) are compared with products according to the invention (Examples 1 and 2).

The products were manufactured either by continuous mass polymerization (M) of the type described in U.S. Pat. No. 2,694,692 or by continuous mass suspension polymerization (S) of the type described in U.S. Pat. No. 2,862,906. In each case, the rubber employed was polybutadiene with 35% 1,4-cis, 55% 1,4-trans and 10% 1,2-vinyl configurations; the monomer employed was styrene. All the products contained 0.1% by weight of di-tert.-butyl-p-cresol as an antioxidant. The lubricants used were mineral oil (viscous paraffin oil, German Pharmacopoeia 7) or butyl stearate. Further details are given in the Tables which follow. The rubber content is based on the impact-resistant polymer, whilst the amount of mineral oil or butyl stearate added is based on the total molding composition.

TABLE 1

| Example or Comparative Experiment | Process of manufacture | Rubber content, % by weight | Added mineral oil % by weight | Added butyl stearate, % by weight | G % % by weight | Q | S % | D /$\mu$ |
|---|---|---|---|---|---|---|---|---|
| 1 | M | 8 | 2 | — | 33 | 12.5 | 31 | 6.6 |
| A | M | 8 | 2 | — | 27 | 12.3 | 25 | 7.7 |
| B | M | 8 | — | 1.5 | 30 | 12.1 | 0 | 5.5 |
| C | M | 8 | 2 | — | 31 | 12.7 | 9 | 3.3 |
| D | M | 8 | 2 | — | 30 | 8.8 | 32 | 12.6 |
| 2 | S | 8.0 | 2 | — | 33 | 11.7 | 26 | 5.8 |
| E | S | 8.6 | 2 | — | 36 | 8.2 | 28 | 6.2 |

The abbreviations have the following meanings:
G: content of soft component, based on the impact-resistant polymer.
Q: swelling index.
S: ratio of tensile strength to yield strength, in percent.
D: mean particle size diameter of the disperse soft component.

TABLE 2

| Example or Comparative Experiment | Resistance to stress corrosion cracking | |
|---|---|---|
| | a) Resistance to fat: breaking stress (kg/cm$^2$) | b) Resistance to low-boiling halohydrocarbons. Elongation (% of initial value) |
| 1 | 45 | 97 |
| A | 37 | 71 |
| B | 24.8 | 40 |
| C | 26.2 | 68 |
| D | 32 | 69 |
| 2 | 42 | 86 |
| E | 28 | 55 |

It follows from the data in the Table that the properties desired in practice are only achieved when all the characteristics defined in the claims are present simultaneously. If one of the properties — regardless of the reason — does not conform to the requirements, the stress cracking resistance of the product is unsatisfactory.

We claim:

1. A thermoplastic molding composition consisting essentially of a rubber-modified polymer of a monovinyl-aromatic compound, said rubber-modified polymer being impact resistant and having improved stress-crack resistance and having been obtained by the polymerization of the monovinyl-aromatic compound in the presence of the rubber, said composition having as the disperse phase in the continuous phase consisting essentially of the poly(vinyl aromatic) polymer a soft component composed of particles of graft copolymers of the rubber and said polymer of said monovinyl-aromatic compound and also part of said polymer of said monovinyl-aromatic compound which has been mechanically occluded in the rubber particles during the said polymerization and said soft component further being the toluene-insoluble constituent of said rubber-modified polymer, minus any pigment which may be present, in which molding composition (1) the proportion of soft component dispersed in the rubber-modified polymer is at least 28% up to 60% by weight, based on the said polymer, (2) the particles of the disperse soft component phase in the rubber-modified polymer have a mean diameter, as determined by weight average, of 4$\mu$ up to 10$\mu$, (3) the swelling index of the soft component in toluene is greater than 9.5 and (4) the tensile strength of the thermoplastic molding composition, measured on a compression-molded dumbbell-shaped bar by the Deutches Industrie-Norm 53,455 tensile test, is at least 5% above the corresponding yield strength.

2. A thermoplastic molding composition as claimed in claim 1, wherein the proportion of soft component in the polymer is from 30 to 40% by weight, based on the said polymer.

3. A thermoplastic molding composition as claimed in claim 1, wherein the rubber content of the polymer is from 2 to 15% by weight.

4. A thermoplastic molding composition as claimed in claim 1, wherein the particles of the disperse soft component phase in the polymer have a mean diameter, as determined by weight average, of from 5 to 10μ.

5. A thermoplastic molding composition as claimed in claim 1, wherein the swelling index of the soft component in toluene is from 11 to 13.

6. A thermoplastic molding composition as claimed in claim 1, wherein the tensile strength of the thermoplastic molding compositions, measured on a compression-molded dumbbell-shaped bar by said tensile test, is from 10 to 50% above the corresponding yield strength.

7. A thermoplastic molding composition as claimed in claim 1, wherein said monovinyl-aromatic compound is styrene, and wherein said rubber is selected from the group consisting of natural rubber, polybutadiene, polyisoprene and a copolymer of at least one of butadiene and isoprene with styrene.

8. A thermoplastic molding composition as set forth in claim 1, wherein the monovinyl-aromatic compound is styrene.

9. A thermoplastic molding composition as set forth in claim 8, wherein the rubber is selected from the group consisting of natural rubber, polybutadiene, polyisoprene, a copolymer of butadiene and styrene and a copolymer of isoprene and styrene.

10. A thermoplastic molding composition as set forth in claim 9, wherein
(1) the dispersed soft component constitutes from 30 to 40% by weight of the rubber modified polymer,
(2) the particles of the dispersed soft component of the rubber modified polymer have a mean diamter, as determined by weight average, of from 4 to 10μ,
(3) the swelling index of the soft component in toluene is in the range from 11 to 13 and
(4) the tensile strength of the thermoplastic molding composition, measured on a compression-molded dumbbell-shaped bar by the Deutsche Industrie-Norm 53,455 tensile test, is from 10 to 50% above the corresponding yield strength.

* * * * *